Nov. 2, 1948.   L. M. COLES   2,452,732
HAND CULTIVATING TOOL
Filed Oct. 22, 1945
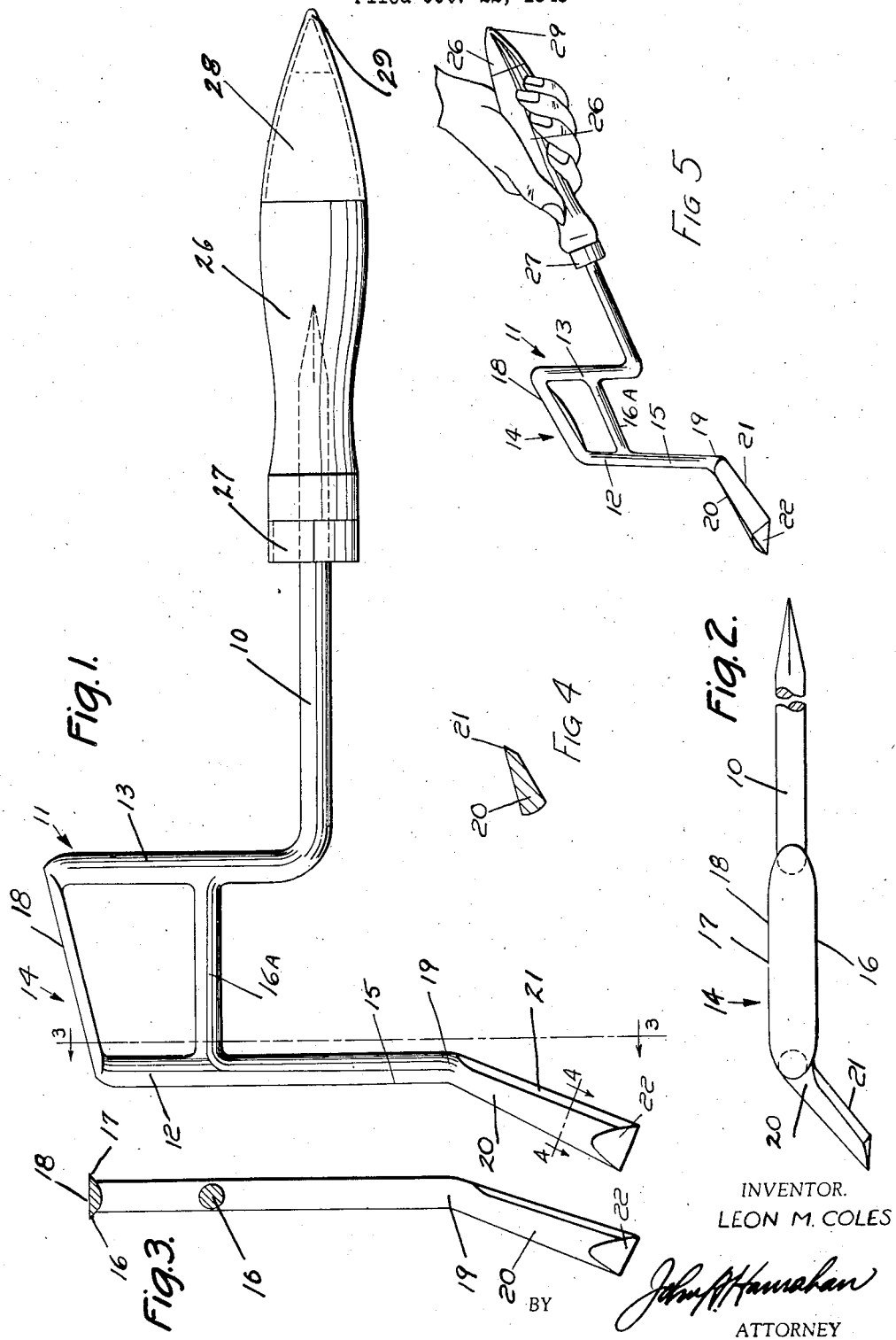
INVENTOR.
LEON M. COLES
BY
ATTORNEY Patented Nov. 2, 1948

2,452,732

UNITED STATES PATENT OFFICE 2,452,732

HAND CULTIVATING TOOL

Leon M. Coles, Port Chester, N. Y.

Application October 22, 1945, Serial No. 623,667

4 Claims. (Cl. 97—61)

This invention relates to garden tools and more particularly to tools which are used with one hand to work around flowers and vegetables closely spaced with respect to each other.

Tools such as trowels and fingered or claw scratchers have their specific use but are not altogether satisfactory for the removal of weeds which are deep rooted. Such tools cannot be used in a swinging manner much like the tools used in larger gardens, such as hoes and grub tools, and hence cannot be forced into the ground except by application of direct force.

It is an object of the present invention to provide a sturdy hand tool for small garden uses, which can be used in limited areas, which will remove deep-rooted weeds with ease, and in which its operation can be effected with a chopping action.

It is another object of the invention to provide a hand tool which can be made of standard round stock by a simple bending and flattening operation to provide cutting edges thereon.

According to the invention, a piece of round stock is heated and bent at several places to provide a cutting edge at its top slightly inclined with respect to the handle shank and at its bottom side with a depending and bent back knife edge or hook portion. The top cutting edge is formed from a more or less double bent portion of the stock, one side of which continues downwardly to form the hook-like cutting edge. The double-bent portion is reinforced by a spacing member connected between the parallel end sections and below the cutting edge thereof. On the handle shank is a wood handle ferruled at its inner end and shaped and encased at its rear end to provide a dibble tip which can be used in transplanting small plants.

For other objects and for a better understanding of the invention, reference may be had to the following detailed description taken in connection with the accompanying drawings, in which Fig. 1 is a side plan view of the tool including the handle;

Fig. 2 is a plan view looking down onto the device as shown in Fig. 1 with the handle removed;

Fig. 3 is a sectional view, in elevation, taken along the line 3—3 of Fig. 1;

Fig. 4 is an enlarged cross-sectional view taken through depending knife edge, along the line 4—4 of Fig. 1; and Fig. 5 is a perspective view, on a small scale, showing one manner of use of the tool.

Referring now to the drawing, my tool includes a handle shank portion 10 and a double-bent or U-shaped portion 11. Portion 11 includes arms 12 and 13 and a connecting portion 14. Integral with arm 12 is an extension 15. The tool as thus described is made from a continuous piece of round stock, heat treated and bent to the desired shape. The extension 15 ends at a point radially-removed from the shank axis.

The arms 12 and 13 of the double-bent portion 11 are parallel and spaced apart and in addition to the portion 14 are connected together by a reinforcing bar 15 welded or otherwise secured to the arms. By forging and grinding connecting portion 14 is flattened into a double-knife portion having the cutting edges 16 and 17 and a flat outer face 18, Fig. 3. The knife or connecting portion 14 is inclined from its rear end at side or arm 12 towards its inner end at side 13.

The amount of this inclination has been determined by experiment and is such that as the person using the tool wields the same from side to side, from a kneeling or seated position, the knife edges will extend substantially parallel to the ground surface and normal to vertically-extending base portions of the weeds. As this portion of the tool is used, the knife edge will plow under the roots of the weeds, but such weeds as are not passed under are cut near their roots with either of the cutting edges 16 and 17.

The extension 15 is coextensive with the arm 12 of the double-bent portion 11 and is bent forwardly at its lower end as indicated at 19 to provide a forwardly extending portion 20 with a sharpened edge 21 and at its outer end is provided with a chisel-like edge 22. Not only is the portion 20 bent back as indicated in Fig. 1 but also it is bent to one side out of the vertical plane of the tool as shown in Fig. 3 of the drawing.

Cutting portion 20 thus takes a form more or less in the nature of a grass hook and such that the tool can be used in the same manner or with the same action but more often operating in the soil. With the cutting edge 21 so formed, the weeds, upon the tool being wielded into the ground at an angle, will be sheared if not dug out of the ground from the roots, by the passage of the edge over or under the weed. By giving the tool a definite inclination with the hand, the chisel-like edge 22 can be brought directly into play.

At such time the point or edge 22 may be used in loose or cultivated soil to raise out seedlings, such as beets or the like for replanting. Also by holding the device with portion 20 parallel or substantially parallel with the ground the point 22 may be used to cut or chop between plants of a row, as to thin out the plants or to remove weeds. At such time, owing to the angular relation of portion 20 to the shank 10 the edge 22 is given a back and forth motion nearly parallel with the portion 15 or normal to the shank and handle.

When cutting weeds or the like with the edge 21, the device is held at a convenient angle and yet the edge 21 is parallel or substantially parallel with the ground. This is as best illustrated in Fig. 5 wherein the device is shown as held in the hand. For digging out deep rooted weeds the edge or point 22 is placed on the ground near the root and by pressure on the flat surface 18 the point is forced into the ground along side the root and then by a lateral pressure rocked or tilted to raise the weed, as a dandelion, out of the ground. At this time the brace 16 materially strengthens the device. When the weed has been removed the loosened soil may be packed or tamped in place by tapping with the flat side or surface 18 of the connecting portion 14.

From the above it will be clear that the various bends and the various angles of the parts gives a structure to be used with natural movements of the hand, arm and wrist. The user of the present tool does not twist his arm or wrist into an unnatural position to use the tool. When the tool is held in a natural position the chisel point 22 will work almost straight back and forth as the tool is swung and does not hook in toward the user on an arc. Whenever the chisel point is used for digging the tool will reverse itself in on the operator releasing his grip and swing to a position with portion 14 downward for tamping. Edges 16 and 17 may be used for cutting simply by swinging the device back and forth.

On the shank portion 10 there is fitted a wooden handle 26 reinforced at its inner end by a ferrule 27 and at its rear end with a pointed sheet metal cup 28 formed into a point as indicated at 29 to provide the tool with a dibble tip for use in transplanting small plants.

It should now be apparent that there has been provided a garden tool particularly adapted for use in gardens where the plants are spaced close together which will get results with a minimum of effort. That the tool is such that it can be used in a swinging manner and thus eliminates the necessity for the direct application of force in use.

While various changes may be made in the detailed construction it should be understood that such changes shall be within the spirit and scope of the present invention as defined by the appended claims.

What is claimed is:

1. In a garden tool, a handle shank portion, a double-bent portion located radially of said shank portion and including a bight portion and inner and outer substantially parallel arms continuing from said shank portion, a brace and hand portion connecting said arms between said bight portion and a point in the plane of the longitudinal axis of said handle shank portion, an extension continuing from the free end of the outer arm of said double-bent portion radially beyond and substantially perpendicular to said handle shank portion, said extension radially beyond said handle shank portion offset in directions laterally of and longitudinally beyond said handle shank portion, said offset extension portion having a cutting edge at one of its longitudinal edges, and said bight portion having cutting edges at its longitudinal edges.

2. In a garden tool, a handle shank portion, a double-bent portion located radially of said shank portion and including a bight portion and inner and outer substantially parallel arms continuing from said shank portion, a brace and hand portion connecting said arms between said bight portion and a point in the plane of the longitudinal axis of said handle shank portion, an extension continuing from the free end of the outer arm of said double-bent portion radially beyond and substantially perpendicular to said handle shank portion, said extension radially beyond said handle shank portion offset in directions laterally of and longitudinally beyond said handle shank portion, said offset extension portion having a cutting edge at one of its longitudinal edges, said bight portion having cutting edges at its longitudinal edges, and said bight portion inclining from said inner arm forwardly and in the direction of the longitudinal axis of the handle shank portion whereby the handle shank portion will be at an angle to a surface when said bight portion is parallel to said surface to dispose the handle shank portion away from said surface.

3. In a garden tool, a handle shank portion, a double-bent portion located radially of said shank portion and including a bight portion and inner and outer substantially parallel arms continuing from said shank portion, an extension continuing from the free end of the outer arm of said double-bent portion radially beyond and substantially perpendicular to said handle shank portion, said extension radially beyond said handle shank portion offset in directions laterally of and longitudinally beyond said handle shank portion, said offset extension portion having a cutting edge at one of its longitudinal edges, and said bight portion having cutting edges at its longitudinal edges.

4. In a garden tool, a handle shank portion, a double-bent portion located radially of said shank portion and including a bight portion and inner and outer substantially parallel arms continuing from said shank portion, an extension continuing from the free end of said double-bent portion radially beyond and substantially perpendicular to said handle shank portion, said extension radially beyond said handle shank portion offset in directions laterally of and longitudinally beyond said handle shank portion, said offset extension portion having a cutting edge at one of its longitudinal edges, said bight portion having cutting edges at its longitudinal edges, and said bight portion inclining from said inner arm forwardly and in the direction of the longitudinal axis of the handle shank portion whereby the handle shank portion will be at an angle to a surface when said bight portion is parallel to said surface to dispose the handle shank portion away from said surface.

LEON M. COLES.

REFERENCES CITED

The following references are of record in the file of this patent:

UNITED STATES PATENTS

| Number | Name | Date |
| --- | --- | --- |
| 766,808 | Buckley | Aug. 9, 1904 |
| 1,277,894 | Forsythe | Sept. 3, 1918 |
| 1,342,392 | Oleen | June 1, 1920 |
| 1,770,072 | Fordyce | July 8, 1930 |

FOREIGN PATENTS

| Number | Country | Date |
| --- | --- | --- |
| 260,857 | Great Britain | Nov. 11, 1926 |